(12) United States Patent
Kitazato

(10) Patent No.: US 10,523,467 B2
(45) Date of Patent: Dec. 31, 2019

(54) TRANSMISSION DEVICE, TRANSMISSION METHOD, RECEPTION DEVICE AND RECEPTION METHOD

(71) Applicant: SONY CORPORATION, Tokyo (JP)

(72) Inventor: Naohisa Kitazato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 155 days.

(21) Appl. No.: 15/563,638

(22) PCT Filed: Apr. 8, 2016

(86) PCT No.: PCT/JP2016/061483
§ 371 (c)(1),
(2) Date: Oct. 2, 2017

(87) PCT Pub. No.: WO2016/171001
PCT Pub. Date: Oct. 27, 2016

(65) Prior Publication Data
US 2018/0069728 A1    Mar. 8, 2018

(30) Foreign Application Priority Data

Apr. 24, 2015 (JP) ................................ 2015-089131

(51) Int. Cl.
*H03M 13/00* (2006.01)
*H04L 12/54* (2013.01)
(Continued)

(52) U.S. Cl.
CPC ........... *H04L 12/56* (2013.01); *H04N 21/236* (2013.01); *H04N 21/2362* (2013.01); *H04N 21/434* (2013.01); *H04N 21/4345* (2013.01)

(58) Field of Classification Search
CPC ............... H04N 21/236; H04N 21/434; H04N 21/4345; H04N 21/234; H04N 21/235;
(Continued)

(56) References Cited

U.S. PATENT DOCUMENTS

2017/0257647 A1* 9/2017 Iguchi .................. H04N 21/231
2017/0359611 A1* 12/2017 Iguchi .................. H04N 21/242

FOREIGN PATENT DOCUMENTS

JP    2010-272071 A    12/2010
WO    2016/079946 A1    5/2016

OTHER PUBLICATIONS

International Search Report dated Jul. 12, 2016, in PCT/JP2016/061483, filed Apr. 8, 2016.
(Continued)

*Primary Examiner* — Guerrier Merant
(74) *Attorney, Agent, or Firm* — Oblon, McClelland, Maier & Neustadt, L.L.P.

(57) ABSTRACT

A specific UTC time corresponding to a specific NPT time is appropriately obtained in a reception side without being influenced by occurrence of a leap second.
Transmission media of a program are transmitted, and mapping information between an NTP time represented by a relative time from a beginning of a program and a UTC time represented by an absolute time is intermittently transmitted. Leap second adjustment information is included in the mapping information. In the reception side, the specific UTC time corresponding to the specific NPT time obtained on the basis of the mapping information can be adjusted on the basis of the leap second adjustment information, and the influence of occurrence of the leap second can be avoided.

10 Claims, 16 Drawing Sheets

(51) Int. Cl.
*H04N 21/236* (2011.01)
*H04N 21/434* (2011.01)
*H04N 21/2362* (2011.01)

(58) Field of Classification Search
CPC ............. H04N 21/8456; H04N 21/242; H04N 21/8547; H04N 21/633; H04N 21/2343; H04N 21/2365; H04N 21/2381; H04N 21/2389; H04N 21/43; H04N 21/4302; H04N 21/4307; H04N 21/4347; H04N 21/8451; H04N 21/4305; H04N 21/83; H04L 12/56; H04L 65/4076; H04J 3/0661; H04H 60/40
See application file for complete search history.

(56) References Cited

OTHER PUBLICATIONS

Association of Radio Industries and Businesses, "MMT-Based Media Transport Scheme in Digital Broadcasting Systems", ARIB STD-B60, Ver. 1.2, Mar. 17, 2015, 6 pages with English translation.

\* cited by examiner

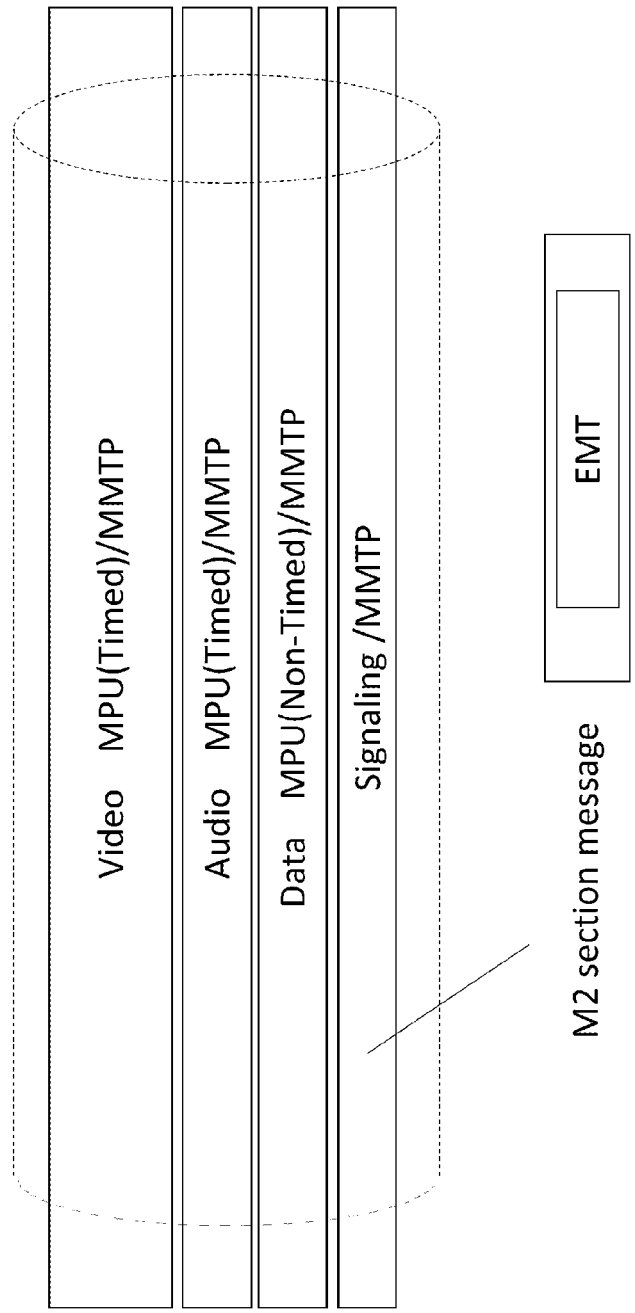

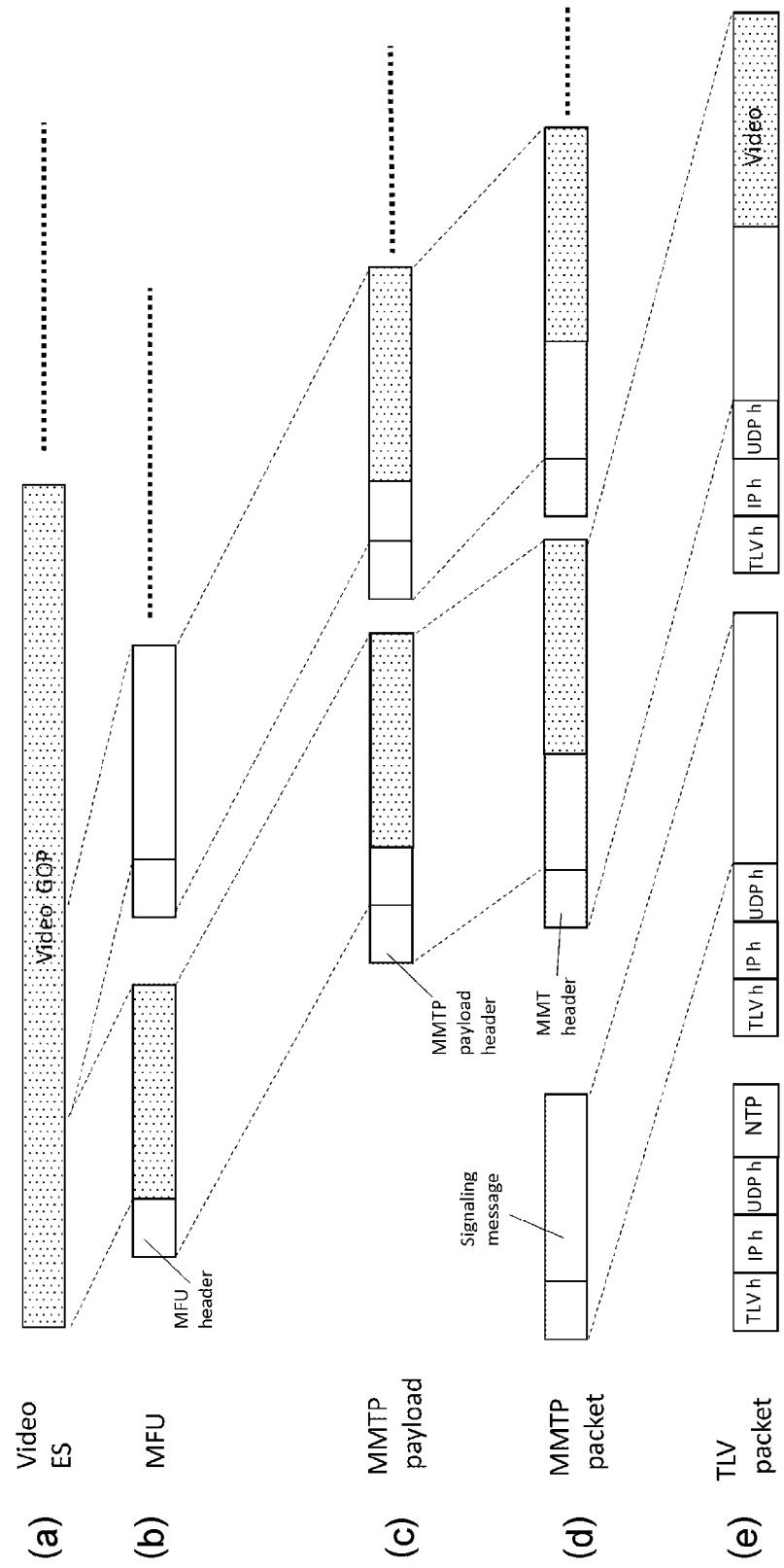

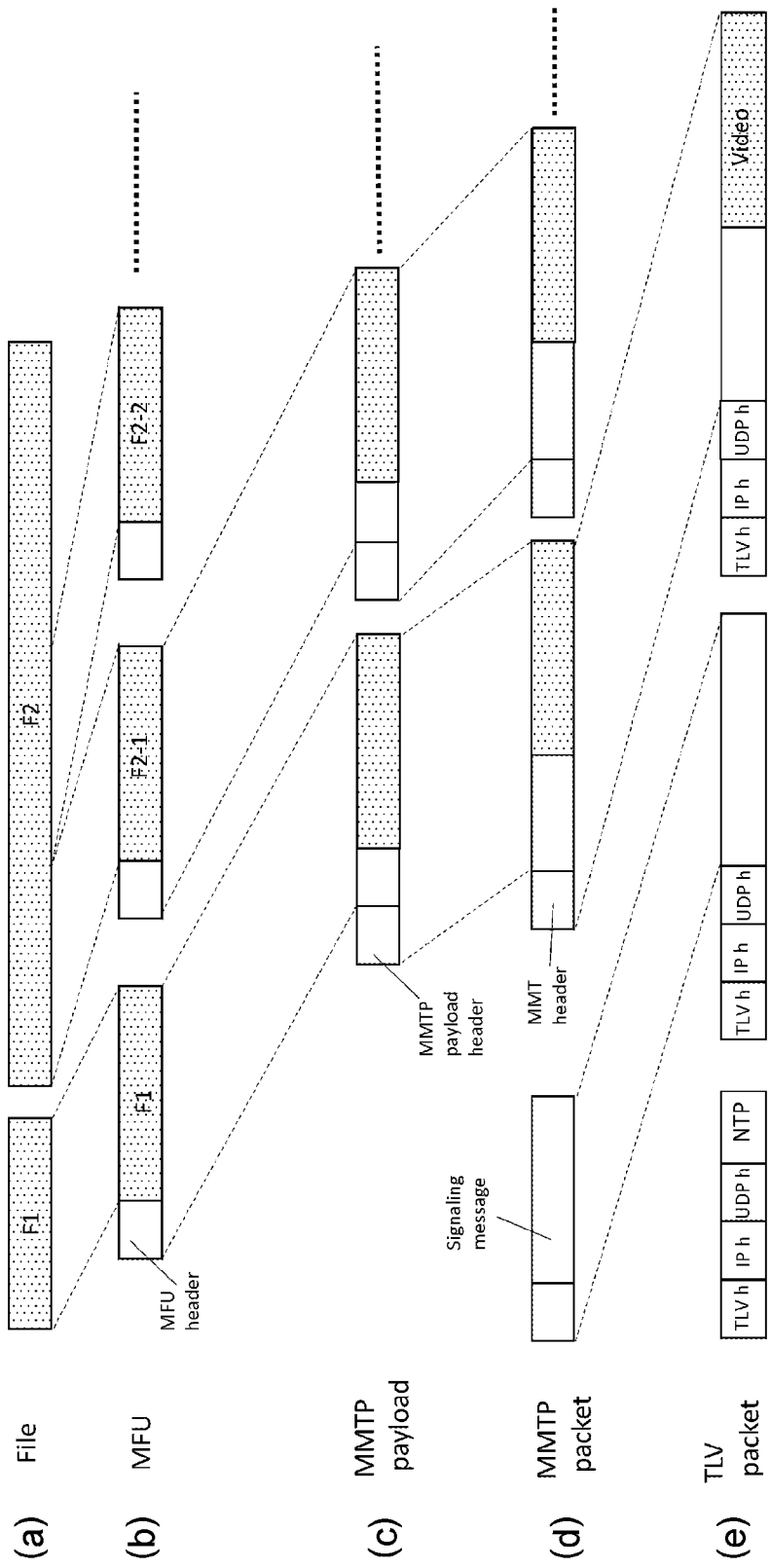

*FIG. 6*

NETWORK TIME PROTOCOL DATA

| Syntax | No. of Bits | Format |
|---|---|---|
| Network_Time_Protocol_Data ( ) { | | |
|     leap_indicator | 2 | uimsbf |
|     version | 3 | uimsbf |
|     mode | 3 | uimsbf |
|     stratum | 8 | uimsbf |
|     poll | 8 | uimsbf |
|     precision | 8 | uimsbf |
|     root_delay | 32 | uimsbf |
|     root_dispersion | 32 | uimsbf |
|     reference_identification | 32 | uimsbf |
|     reference_timestamp | 64 | uimsbf |
|     origin_timestamp | 64 | uimsbf |
|     receive_timestamp | 64 | uimsbf |
|     transmit_timestamp | 64 | uimsbf |
| } | | |

| LEAP SECOND INDICATOR | MEANING |
|---|---|
| 0 | NO WARNING |
| 1 | LAST 1 MINUTE HAS 61 SECONDS |
| 2 | LAST 1 MINUTE HAS 59 SECONDS |
| 3 | WARNING |

(b)

| OPERATION MODE | MEANING |
|---|---|
| 0 | reserved |
| 1 | CURRENT ACTIVE MODE |
| 2 | CURRENT PASSIVE MODE |
| 3 | CLIENT |
| 4 | SERVER |
| 5 | BROADCAST |
| 6 | NTP CONTROL MESSAGE |
| 7 | reserved for private use |

FIG. 8

EVENT MESSAGE TABLE

| Syntax | No. of Bits | Format |
|---|---|---|
| Event_Message_Table (){ | | |
| table_id | 8 | uimsbf |
| section_syntax_indicator | 1 | bslbf |
| reserved_future_use | 1 | bslbf |
| reserved | 2 | bslbf |
| section_length | 12 | uimsbf |
| data_event_id | 4 | uimsbf |
| event_msg_group_id | 12 | uimsbf |
| reserved | 2 | bslbf |
| version_number | 5 | uimsbf |
| current_next_indicator | 1 | bslbf |
| section_number | 8 | uimsbf |
| last_section_number | 8 | uimsbf |
| for(i=0; I < N; i++){ | | |
| descriptor () | | |
| } | | |
| CRC_32 | 32 | rpchof |
| } | | |

FIG. 9

UTC-NPT REFERENCE DESCRIPTOR

| Syntax | No. of Bits | Format |
|---|---|---|
| UTC-NPT_Reference_Descriptor (){ | | |
| descriptor_tag | 16 | uimsbf |
| descriptor_length | 8 | uimsbf |
| UTC_Reference | 64 | uimsbf |
| NPT_Reference | 64 | uimsbf |
| scale | 2 | bslbf |
| UN_leap_control | 2 | bslbf |
| reserved | 4 | bslbf |
| } | | |

UN_leap_control

|    | MEANING |
|----|---------|
| 00 | DO NOT USE |
| 01 | ADJUSTMENT BEFORE LEAP SECOND ADDITION (INCLUDING FIRST SECOND OF TIMES OVERLAPPING DUE TO LEAP SECOND ADDITION) |
| 10 | ADJUSTMENT BEFORE LEAP SECOND DELETION |
| 11 | ADJUSTMENT IS NOT NECESSARY (INCLUDING SECOND SECOND OF TIMES OVERLAPPING DUE TO LEAP SECOND ADDITION) |

CORRESPONDENCE BETWEEN NPT AND UTC

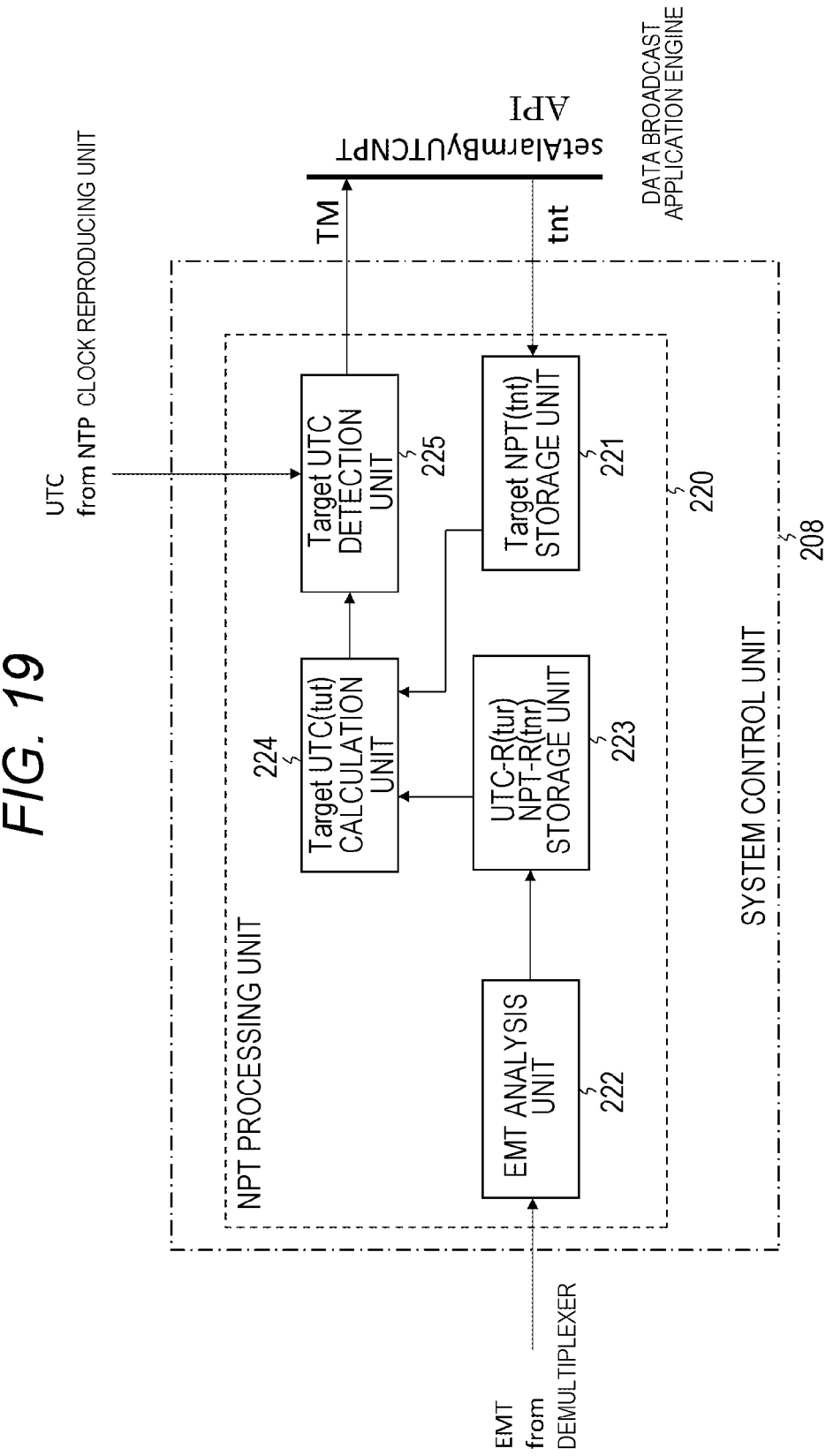

TRANSMISSION DEVICE, TRANSMISSION METHOD, RECEPTION DEVICE AND RECEPTION METHOD

TECHNICAL FIELD

The present technology relates to a transmission device, a transmission method, a reception device and a reception method, and in particular relates to a transmission device and the like that transmit transmission media of a program, such as video and audio.

BACKGROUND ART

Normal Play Time (NPT) is mainly used in an application such as HTML, and indicates a time axis of relative time from the beginning of a specific stream source. In a program-linked application, by using the NPT, regardless of an actual broadcast time, it is possible to describe application operation in which a relative time on a program source (for example, indicated by time from the beginning and not including a Commercial Message (CM)) is specified.

The NPT is realized by intermittently transmitting an Event Message Table (EMT) in which a UTC-NPT reference descriptor is arranged, in a broadcast signal (see Non-Patent Document 1). The UTC-NPT reference descriptor includes mapping information between a pair of a Coordinated Universal Time (UTC) time and a Normal Play Time (NPT) time at the time ahead of reception.

By intermittently acquiring the UTC-NPT reference descriptor, it is possible to perform time conversion from the UTC time to the NPT time, or from the NPT time to the UTC time, at any point in time. Further, as the NPT of a main program, in a case where a Commercial Message (CM) enters the program, even if a UTC time passes, a mechanism is also included that can stop the NPT during that time.

As a use example to an application, it can be considered to set a timer in which a specific NPT time is specified to generate a timer event when the time comes, and start execution of the application. With this configuration, it is possible to produce an application linked in a specific scene in advance, regardless of an actual broadcast time and a CM insertion position.

CITATION LIST

Non-Patent Document

Non-Patent Document 1: ARIB STD-B60 version 1.2, "Media transport method by MMT in digital broadcasting, Mar. 27, 2014 1.2 revision, [online], [search on Apr. 15, 2015], Internet <URL:http://www.arib.or.jp/english/html/overview/doc/2-STD-B60v1_2.pdf>

SUMMARY OF THE INVENTION

Problems to be Solved by the Invention

In a case where a leap second occurs, the UTC time influenced, and NPT time processing by the UTC-NPT reference descriptor is also influenced. At least, with an existing countermeasure, erroneous calculation from the UTC time to the NPT time, or from the NPT time to the UTC time may occur. For example, in a case where the UTC time specified by the UTC-NPT reference descriptor is a leap second addition target time, it cannot be distinguished whether the time is a former overlapping second or a latter overlapping second, so that an erroneous result is obtained.

Incidentally, in a case where the UTC time specified by the UTC-NPT reference descriptor avoids a leap second target time, it is also possible to obtain information from a leap second indicator (leap_indicator) of a Network Time Protocol (NTP) and perform calculation considering that the leap second exists. However, since NTP reception and MMT-SI reception are different processing systems from each other, it is desirable to be able to perform leap second control by closing with MMT-SI.

An object of the present technology is to appropriately obtain a specific UTC time corresponding to a specific NPT time in a reception side without being influenced by occurrence of the leap second.

Solutions to Problems

A concept of the present technology is in
a transmission device including
a transmission unit that transmits transmission media of a program, and intermittently transmits mapping information between an NTP time represented by a relative time from a beginning of the program and a UTC time represented by an absolute time with leap second adjustment information included.

In the present technology, the transmission media of the program are transmitted by the transmission unit. In addition, the mapping information between the NPT time represented by the relative time from the beginning of the program and the UTC time represented by the absolute time, with the leap second adjustment information included, is intermittently transmitted by the transmission unit.

For example, the transmission unit may include the transmission media in a first packet to transmit the transmission media, and include the mapping information and the leap second adjustment information in a second packet to transmit the mapping information and the leap second adjustment information. In this case, for example, the first packet and the second packet may be MMTP packets. In addition, for example, the transmission unit may intermittently transmit a UTC-NPT reference descriptor in which the mapping information and the leap second adjustment information are described.

As described above, in the present technology, the leap second adjustment information is included in the mapping information between the NPT time and the UTC time intermittently transmitted. For that reason, in the reception side, the specific UTC time corresponding to the specific NPT time obtained on the basis of the mapping information can be adjusted on the basis of the leap second adjustment information, and it is possible to appropriately obtain the specific UTC time corresponding to the specific NPT time without being influenced by occurrence of the leap second.

In addition, another concept of the present technology is in
a reception device including
a reception unit that receives transmission media of a program, and intermittently receives mapping information between an NPT time represented by a relative time from a beginning of the program and a UTC time represented by an absolute time, the mapping information including leap second adjustment information; and
a time calculation adjustment unit that obtains a specific UTC time represented by an absolute time corresponding to a specific NPT time represented by a relative time from the beginning of the program on the basis of the mapping information intermittently received, and adjusts the specific UTC time obtained, on the basis of the leap second adjustment information.

In the present technology, the transmission media of the program are received by the reception unit. In addition, the mapping information between the NPT time represented by the relative time from the beginning of the program and the UTC time represented by the absolute time is intermittently transmitted by the reception unit. The leap second adjustment information is included in the mapping information.

By the time calculation adjustment unit, the specific UTC time corresponding to the specific NPT time is obtained on the basis of the mapping information intermittently received, and the specific UTC time obtained is adjusted on the basis of the leap second adjustment information.

As described above, in the present technology, the specific UTC time corresponding to the specific NPT time calculated on the basis of the mapping information between the NPT time and the UTC time intermittently transmitted is adjusted on the basis of the leap second adjustment information. For that reason, it is possible to appropriately obtain the specific UTC time corresponding to the specific NPT time without being influenced by occurrence of the leap second.

Incidentally, in the present technology, for example, an application processing unit that executes an application linked with the program may be further included, and the application processing unit may transmit the specific NPT time to the time calculation adjustment unit, and receive the specific UTC time from the time calculation adjustment unit, and start execution of the application at timing of the specific UTC time. In this case, in the application processing unit, it is possible to execute the application linked with the program at correct timing without being influenced by occurrence of the leap second.

Effects of the Invention

With the present technology, it is possible to appropriately obtain the specific UTC time corresponding to the specific NPT time without being influenced by occurrence of the leap second in the reception side. Incidentally, the advantageous effects described in this specification are merely examples, and the advantageous effects of the present technology are not limited to them and may include additional effects.

BRIEF DESCRIPTION OF DRAWINGS

FIG. 3 is a diagram showing an image of a broadcast signal of one channel (broadcast program) transmitted from a broadcast transmission system to a receiver.

FIG. 4 is a diagram showing an example packet configuration in a case where Timed Media are transmitted.

FIG. 5 is a diagram showing an example packet configuration in a case where Non-Timed Media are transmitted.

FIG. 6 is a diagram showing an example structure of NTP data.

FIG. 7 is a diagram for explaining a leap second indicator and an NTP operation mode in the example structure of NTP data.

FIG. 8 is a diagram showing an example configuration of an event message table.

FIG. 9 is a diagram showing an example configuration of a UTC-NPT reference descriptor.

FIG. 19 is a block diagram showing an example configuration of an NPT processing unit in a system control unit.

MODES FOR CARRYING OUT THE INVENTION

Figure 1:
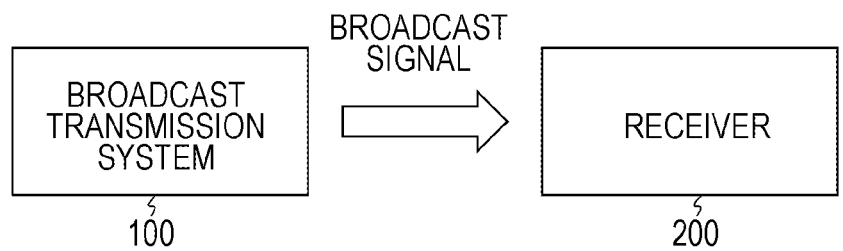
FIG. 1 is a block diagram showing an example configuration of a transmission/reception system as an embodiment.

The following is a description of a mode for carrying out the invention (the mode will be hereinafter referred to as the "embodiment"). Incidentally, explanation will be made in the following order.
1. Embodiment
2. Modifications 1. Embodiment Example Configuration of a
Transmission/Reception System FIG. 1 shows an example configuration of a transmission/reception system 10 as an embodiment. The transmission/reception system 10 is configured by a broadcast transmission system 100 and a receiver 200.

The broadcast transmission system 100 transmits a broadcast signal of an MPEG Media Transport (MMT) system including transmission media of a program, such as video and audio. The broadcast transmission system 100 includes mapping information between a Coordinated Universal Time (UTC) time represented by an absolute time and a Normal Play Time (NPT) time represented by a relative time from the beginning of the program in the broadcast signal of the MPEG Media Transport (MMT) system, to intermittently transmit the mapping information.

The broadcast transmission system 100 includes leap second adjustment information in the mapping information. That is, the broadcast transmission system 100 transmits an Event Message Table (EMT) in which a UTC-NPT reference descriptor in which the mapping information and the leap second adjustment information are described is arranged, by an M2 section Message.

The receiver 200 receives the above-described broadcast signal of the MMT system transmitted from the broadcast transmission system 100. The receiver 200 obtains a specific UTC time corresponding to a specific NPT time on the basis of the mapping information and the leap second adjustment information intermittently included in the broadcast signal. In this case, the receiver 200 calculates the specific UTC time on the basis of the mapping information, and further adjusts the calculated specific UTC time on the basis of the leap second adjustment information, and avoids influence of occurrence of the leap second even if the leap second occurs.

The receiver 200 includes a data broadcast application engine as an application processing unit that performs application processing that executes an application linked with the program. In the data broadcast application engine, an application to be executed at timing of the specific NPT time is registered by an Application Programming Interface (API) of "setAlarmByUTCNPT". The data broadcast application engine starts execution of the registered application at timing of the specific UTC time obtained corresponding to the specific NPT time as described above, and generates a predetermined data broadcast display signal.

Figure 2:
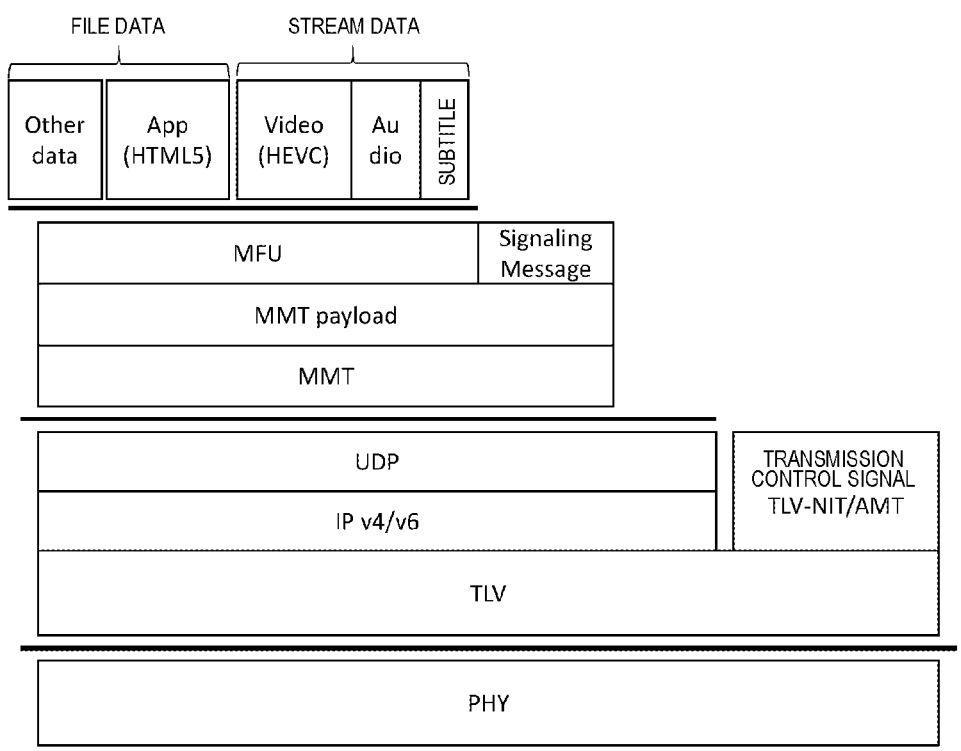
FIG. 2 is a diagram showing a stack model showing an example broadcast signal configuration.

FIG. 2 shows a stack model showing an example broadcast signal configuration. There is a physical layer (PRY) in a lower level. In the physical layer, a modulation method, an error correction method, and the like are included. On the physical layer, there is a layer of a transmission packet of a Type Length Value (TLV). An IP packet is on the transmission packet of the TLV. Further, a User Datagram Protocol (UDP) is on the IP packet. Meanwhile, a transmission control signal as Signaling information is also on the transmission packet of the TLV.

In addition, an MMTP packet is on the UDP. In a payload section of the MMTP packet, an MMT Fragment Unit (MFU) or a Signaling Message is included. As the MFU, stream data such as video and audio, and files (file data) such as HTML document data and other data are inserted.

FIG. 3 shows an image of a broadcast signal of one channel (broadcast program) transmitted from the broadcast transmission system 100 to the receiver 200. In the broadcast signal, an MMTP packet including timed media such as video and audio, and an MMTP packet including non-timed media such as file data are included, and, further, an MMTP packet including a Signaling Message is also included. As one of the Signaling Messages, an M2 section message including the event message table exists.

FIG. 4 shows an example packet configuration in a case where Timed Media are transmitted. FIG. 4(a) shows a video elementary stream (Video ES). The video elementary stream is divided into predetermined-size blocks, and arranged in a payload section of the MFU, as shown in FIG. 4(b).

As shown in FIG. 4(c), an MMTP payload header is added to the MFU, and an MMTP payload is configured. Then, as shown in FIG. 4(d), an MMT header is further added to the MMTP payload, and an MMTP packet is configured. The MMTP packet configures a first packet. Incidentally, in the payload section, an MMTP packet including a Signaling Message also exists. The MMTP packet configures a second packet.

As shown in FIG. 4(e), a UDP header, an IP header, and a TLV header are added to the MMTP packet, and a TLV packet configuring an MMT system broadcast stream is generated. Incidentally, in the TLV packet, an NTP packet including NTP data (Network_Time_Protocol_Data) also exists. In addition, although not shown, as the TLV packet, further, a TLV packet also exists including an MMTP packet of other transmission media such as audio and subtitles.

FIG. 5 shows an example packet configuration in a case where Non-Timed Media are transmitted. FIG. 5(a) shows files (File). Each of F1 and F2 shows one file. For example, F1 is a file to be used in a program, and F2 is a file to be used in a next program.

Since the file of F1 has a small file size, the entire file is arranged in the payload of the MFU, as shown in FIG. 5(b). Meanwhile, the file of F2, since it has a large file size, is divided into multiple blocks, that is, fragments, and each of them is arranged in the payload of the MFU, as shown in FIG. 5(b).

As shown in FIG. 5(c), an MMTP payload header is added to the MFU, and an MMTP payload is configured. In this case, the MFU including the file data of F1, since it has a small size, is arranged in one MMTP payload. Meanwhile, the MFUs respectively including divided data of F2-1, F2-2, . . . are each arranged in one MMTP payload.

As shown in FIG. 5(d), an MMT header is further added to the MMTP payload, and an MMTP packet (MMT packet) is configured. In the payload section, an MMTP packet including a Signaling Message also exists. As shown in FIG. 5(e), a UDP header, an IP header, and a TLV header are added to the MMTP packet, and a TLV packet configuring an MMT system broadcast stream is generated. Incidentally, in the TLV packet, an NTP packet including NTP data also exists.

Example Configuration of NTP Data (Network_Time_Protocol_Data)

FIG. 6 shows an example configuration (Syntax) of NTP data. A 2-bit field of "leap_indicator" is a leap second indicator indicating that the leap second is inserted or deleted into or from the last 1 minute of the current month. The leap second indicator is encoded in accordance with FIG. 7(a). "0" means "no warning", "1" means "the last 1 minute has 61 seconds", "2" means "the last 1 minute has 59 seconds", and "3" means "warning".

A 3-bit field of "mode" indicates an NTP operation mode, and is encoded in accordance with FIG. 7(b). For example, "4" indicates a server mode, and "5" indicates a broadcast mode. A 64-bit field of "transmit_timestamp" is absolute time information to be transmitted, and represented by an NTP long format.

The leap second is inserted or deleted into or from the last 1 minute of the current month as described above, and specifically, 23:59:59 is inserted or deleted. Since NTP indicates Coordinated Universal Time (UTC), that is, Greenwich Mean Time, the above 23:59:59 indicates 8:59:59 in Japan. In the following description, a case in Japan will be described as an example. That is, it will be described assuming that insertion or deletion of the leap second is insertion or deletion of 08:59:59.

Example Configuration of UTC-NPT Reference Descriptor (UTC-NPT_Reference_Descriptor)

The event message table (EMT) will be described. In the MMTP packet, as described above, in the payload, the MMTP packet including the Signaling message also exists. As one of the Signaling messages, the M2 section Message including the event message table exists.

FIG. 8 shows an example configuration (Syntax) of the event message table. The event message table is used for transmitting information on an event message. "Table_id" is a fixed value identifying the event message table. The above-described UTC-NPT reference descriptor is stored in a field of "descriptor ( )".

FIG. 9 shows an example configuration (Syntax) of the UTC-NPT reference descriptor (UTC-NPT_Reference_Descriptor). A 16-bit field of "descriptor_tag" indicates a descriptor type. Here, it is indicated that the descriptor type is the UTC-NPT reference descriptor. An 8-bit field of "descriptor_length" indicates the length (size) of the descriptor, and indicates the number of subsequent bytes as the length of the descriptor.

A 64-bit field of "UTC_Reference" indicates an UTC time, and is represented by the NTP long format. A 64-bit field of "NPT_Reference" indicates an NPT time of when a universal time (UTC) is the "UTC_Reference", and is represented by the NTP long format. A 2-bit field of "scale" indicates a ratio of advance of NPT. "01" indicates that the NPT time continues to be a constant value regardless of the UTC time. "11" indicates that the NPT time advances at the same ratio as the UTC time.

A 2-bit field of "UN_leap_control" is a field to be newly defined. The field indicates the leap second adjustment information, that is, a type of adjustment for the specific UTC time corresponding to the specific NPT time obtained on the basis of the mapping information between the UTC time and the NPT time.

Figures 10, 11:
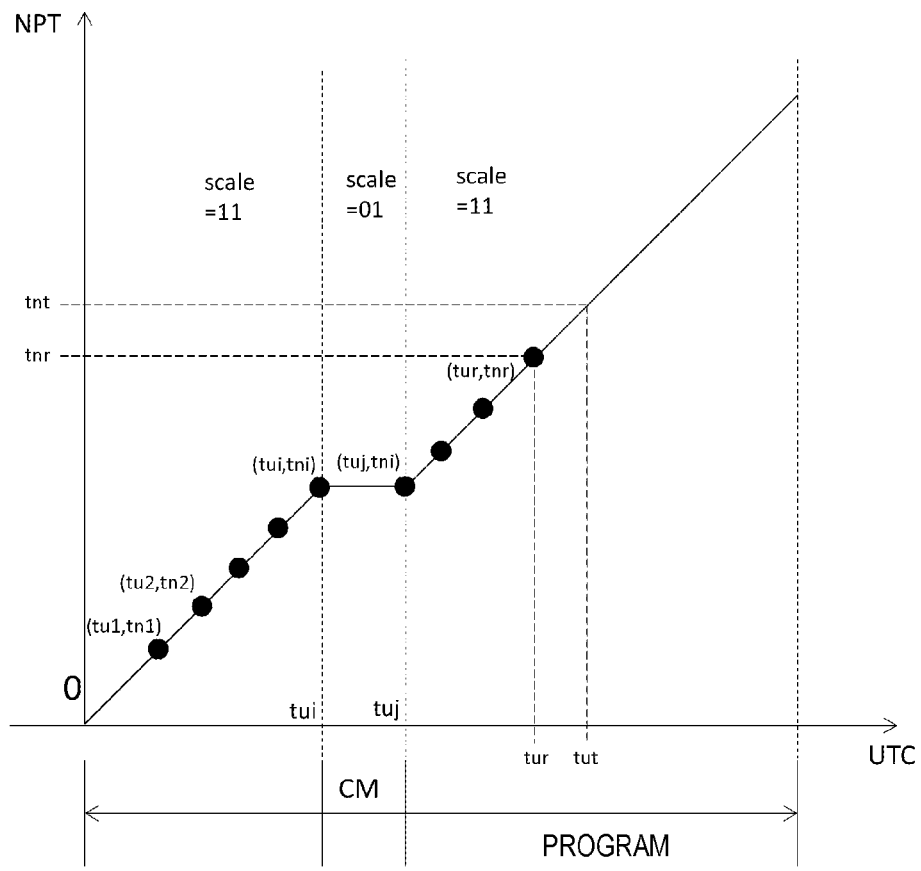
FIG. 10 is a diagram showing a meaning of each value in a field of "UN_leap_control" of the UTC-NPT reference descriptor.
FIG. 11 is a diagram showing an example of a correspondence between NPT and UTC.

FIG. 10 shows a meaning of each value in a field of the "UN_leap_control". "01" indicates that the UTC time indicated by the "UTC_Reference" of the UTC-NPT reference descriptor is a time before the leap second addition (including the first second of times overlapping due to leap second addition), and adjustment corresponding to the time should be made. "10" indicates that the UTC time indicated by the "UTC_Reference" of the UTC-NPT reference descriptor is a time before leap second deletion, and adjustment corresponding to the time should be made. "11" indicates that the UTC time indicated by the "UTC_Reference" of the UTC-NPT reference descriptor is a time other than the above (including the second second of the times overlapping due to leap second addition), and adjustment is not necessary.

Method for Calculating Specific UTC Time

A method will be described for calculating the specific UTC time corresponding to the specific NPT time on the basis of the mapping information between the UTC time and the NPT time. FIG. 11 shows an example of a correspondence between the NPT and the UTC. In the program, one Commercial Message (CM) is inserted therein. The NPT indicates a value that purely counts time of a program part (excluding a CM part) from the beginning of the program.

The NPT advances at the same ratio as the UTC from the beginning of the program. At this time, the "scale" is "11". In the CM part, the NPT remains at a constant value regardless of advance of the UTC. At this time, the "scale" is "01". When the CM part ends, the NPT advances at the same ratio as the UTC, again. At this time, the "scale" is "11".

Each black dot indicates the mapping information between the UTC time and the NPT time intermittently transmitted sequentially by the UTC-NPT reference descriptor. In the reception side, an especially specific UTC time tut corresponding to a specific NPT time tnt is obtained by the following mathematical expression (1), on the basis of last acquired mapping information (tur, tnr).

$$tut = tur + (tnt - tnr) \quad (1)$$

Method for Adjusting Specific UTC Time

Adjustment will be described for the specific UTC time calculated on the basis of the last acquired mapping information (tur, tnr) as described above. The adjustment is performed on the basis of a value of the "UN_leap_control" described in the UTC-NPT reference descriptor together with the mapping information (tur, tnr).

As described above, in a case where the "UN_leap_control" is "01", the UTC time indicated by the "UTC_Reference" is a time before leap second addition (including the first second of the times overlapping due to leap second addition). In this case, until the calculated specific UTC time is "8:59:59", the time is set as the specific UTC time corresponding to the specific NPT time as it is. In addition, in this case, when the calculated specific UTC time passes "8:59:59", a time obtained by subtracting 1 second from the calculated specific UTC time is set as the specific UTC time corresponding to the specific NPT time.

Figure 12:
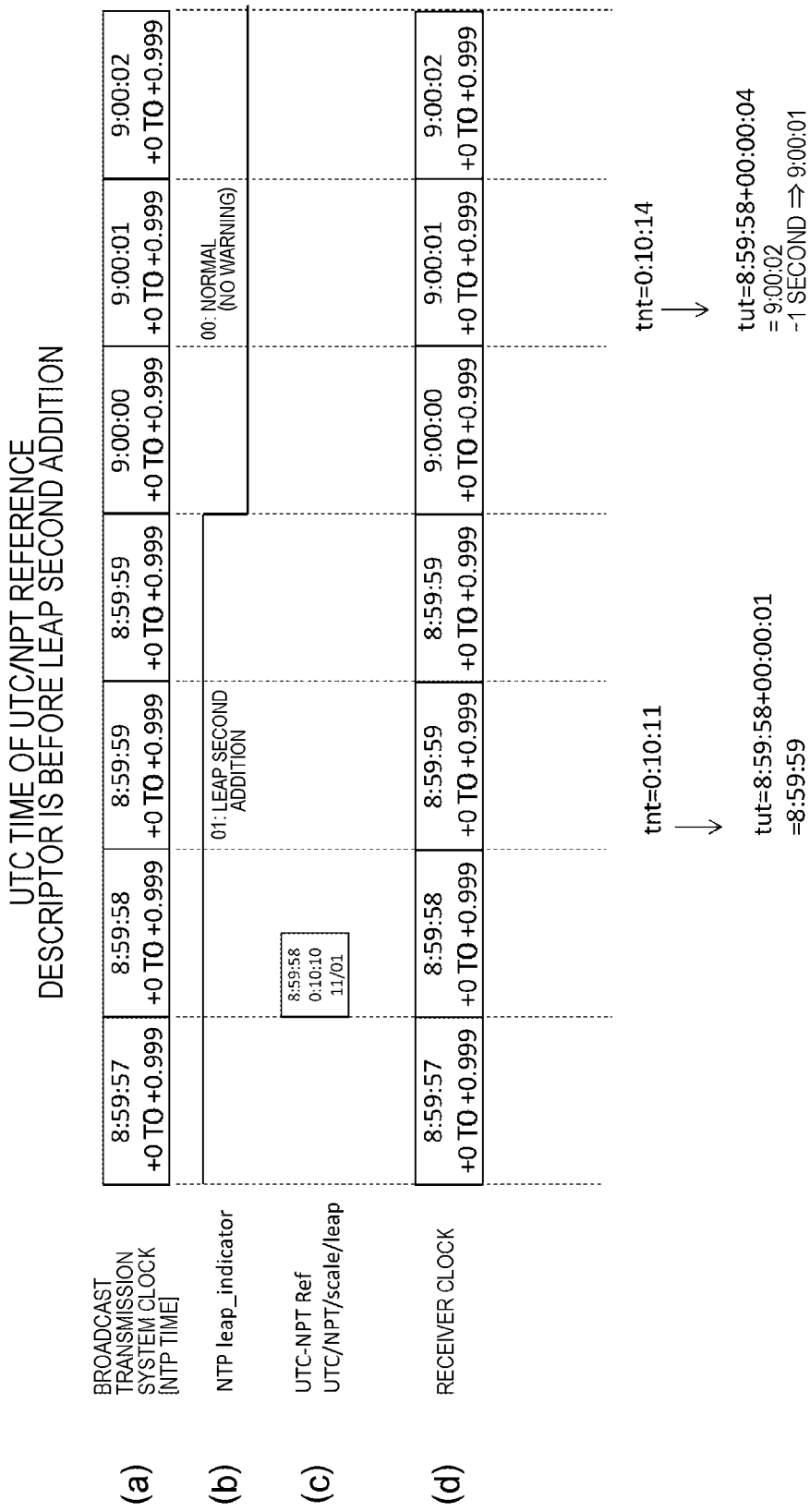
FIG. 12 is a diagram showing example adjustment processing of when a UTC time of the UTC-NPT reference descriptor is a time before leap second addition.

FIG. 12 shows example adjustment processing of when the UTC time of the UTC-NPT reference descriptor is a time before leap second addition. FIG. 12(*a*) indicates absolute time information (NTP time) being a clock of the broadcast transmission system 100, and the leap second is added (inserted). FIG. 12(*d*) indicates absolute time information (NTP time) being a clock of the receiver 200, and the absolute time information changes similarly to the clock of the broadcast transmission system 100.

FIG. 12(*b*) shows a value of the leap second indicator (leap_indicator). In this case, the leap second indicator is "01" until "9:00:00" at which insertion of the leap second ends, and is "00" after that. FIG. 12(*c*) shows the UTC-NPT reference descriptor including the mapping information (tur, tnr). Here, the UTC time tur indicated by the "UTC_Reference" is "8:59:58", and the NPT time tnr indicated by the NPT_Reference" is "0:10:10". In addition, the "scale" is "11", and the "UN_leap_control" is "01".

A case is considered where the specific NPT time tnt is "0:10:11". In this case, on the basis of the above-described mathematical expression (1), the specific NPT time tut is calculated as "8:59:59". In this case, the time is set as the specific UTC time tut corresponding to the specific NPT time tnt as it is.

Next, a case is considered where the specific NPT time tnt is "0:10:14". In this case, on the basis of the above-described mathematical expression (1), the specific NPT time tut is calculated as "9:00:02". In this case, a time obtained by subtracting 1 second from the time, that is, "9:00:01" is set as the specific UTC time tut corresponding to the specific NPT time tnt. With the subtraction adjustment, influence of the leap second addition is removed.

Figure 13:
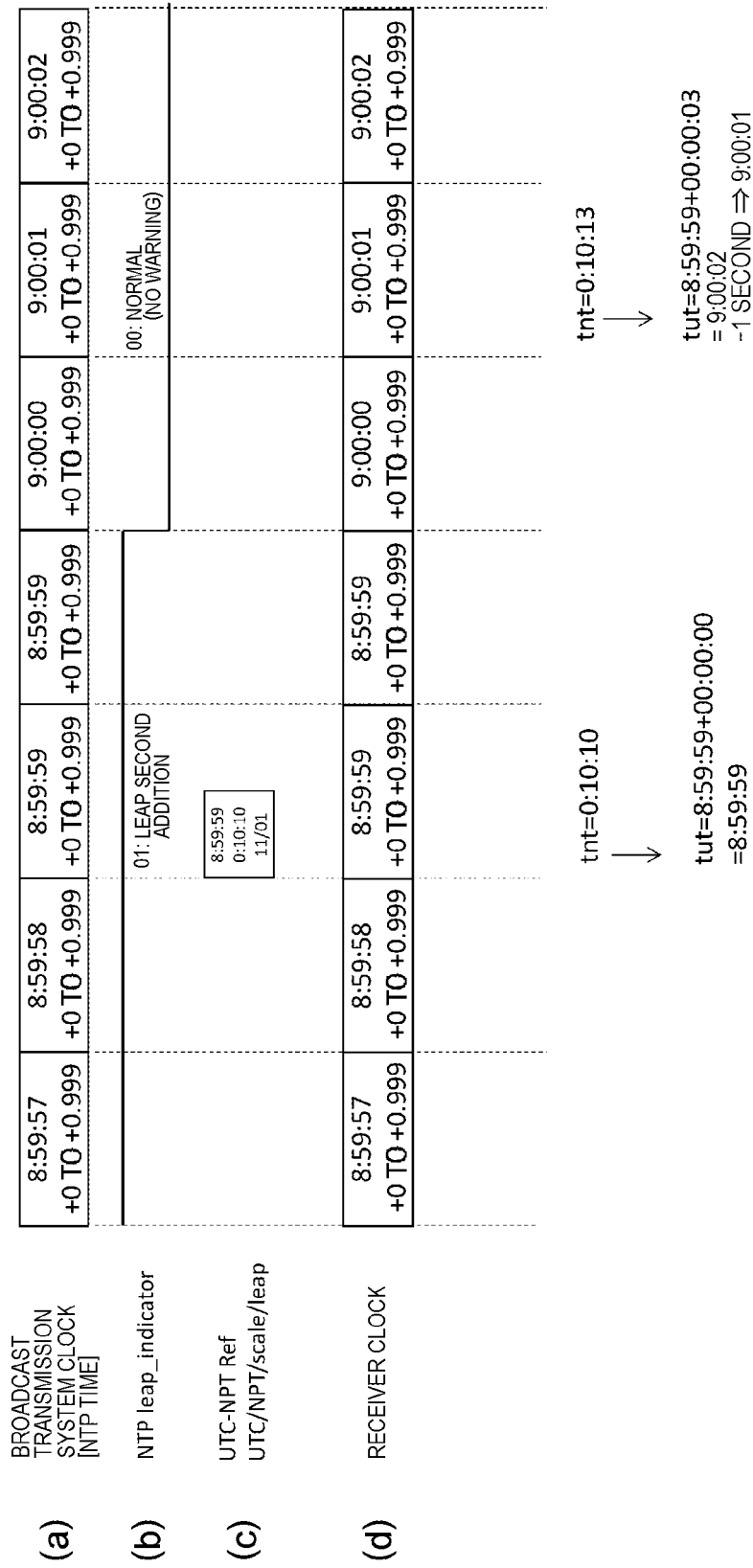
FIG. 13 is a diagram showing example adjustment processing of when the UTC time of the UTC-NPT reference descriptor is the first second of times overlapping due to leap second addition.

FIG. 13 shows example adjustment processing of when the UTC time of the UTC-NPT reference descriptor is the first second of the times overlapping due to leap second addition. FIG. 13(*a*) indicates the absolute time information (NTP time) being the clock of the broadcast transmission system 100, and the leap second is added (inserted). FIG. 13(*d*) indicates the absolute time information (NTP time) being the clock of the receiver 200, and the absolute time information changes similarly to the clock of the broadcast transmission system 100.

FIG. 13(*b*) shows a value of the leap second indicator (leap_indicator). In this case, the leap second indicator is "01" until "9:00:00" at which insertion of the leap second ends, and is "00" after that. FIG. 13(*c*) shows the UTC-NPT reference descriptor including the mapping information (tur, tnr). Here, the UTC time tur indicated by the "UTC_Reference" is "8:59:59", and the NPT time tnr indicated by the "NPT_Reference" is "0:10:10". In addition, the "scale" is "11", and the "UN_leap_control" is "01".

A case is considered where the specific NPT time tnt is "0:10:10". In this case, on the basis of the above-described mathematical expression (1), the specific NPT time tut is calculated as "8:59:59". In this case, the time is set as the specific UTC time tut corresponding to the specific NPT time tnt as it is.

Next, a case is considered where the specific NPT time tnt is "0:10:13". In this case, on the basis of the above-described mathematical expression (1), the specific NPT time tut is calculated as "9:00:02". In this case, a time obtained by subtracting 1 second from the time, that is, "9:00:01" is set as the specific UTC time tut corresponding to the specific NPT time tnt. With the subtraction adjustment, influence of the leap second addition is removed.

In addition, in a case where the "UN_leap_control" is "10", the UTC time indicated by the "UTC_Reference" is a time before leap second deletion. In this case, until the calculated specific UTC time is "8:59:58", the time is set as the specific UTC time corresponding to the specific NPT time as it is. In addition, in this case, when the calculated specific UTC time passes "8:59:58", a time obtained by adding 1 second to the calculated specific UTC time is set as the specific UTC time corresponding to the specific NPT time.

Figure 14:
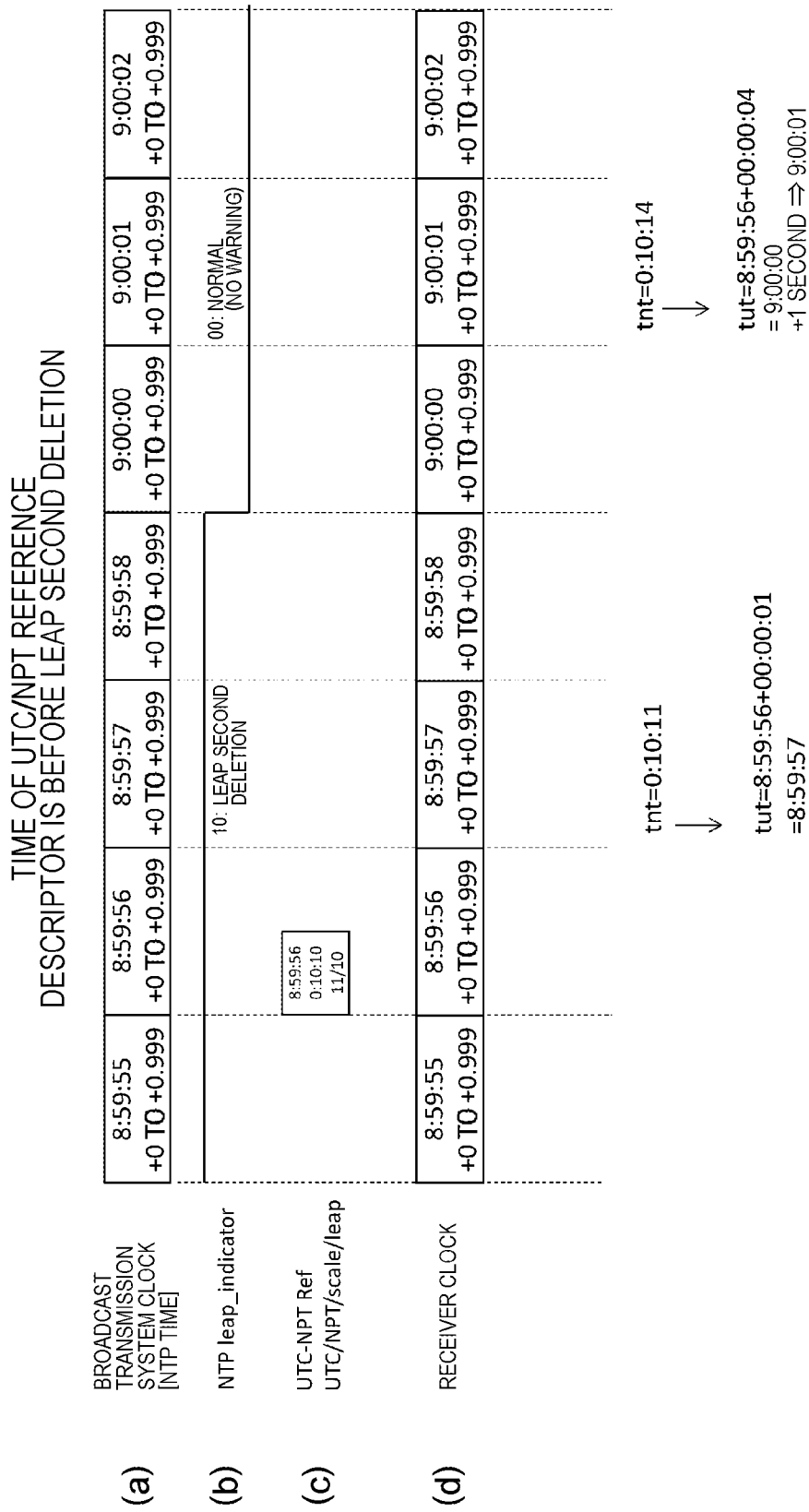
FIG. 14 is a diagram showing example adjustment processing of when the UTC time of the UTC-NPT reference descriptor is a time before leap second deletion.

FIG. 14 shows example adjustment processing of when the UTC time of the UTC-NPT reference descriptor is a time before leap second deletion. FIG. 14(a) indicates the absolute time information (NTP time) being the clock of the broadcast transmission system 100, and the leap second is deleted. FIG. 14(d) indicates the absolute time information (NTP time) being the clock of the receiver 200, and the absolute time information changes similarly to the clock of the broadcast transmission system 100.

FIG. 14(b) shows a value of the leap second indicator (leap_indicator). In this case, the leap second indicator is "10" until "9:00:00" at which deletion of the leap second ends, and is "00" after that. FIG. 14(c) shows the UTC-NPT reference descriptor including the mapping information (tur, tnr). Here, the UTC time tur indicated by the "UTC_Reference" is "8:59:56", and the NPT time tnr indicated by the "NPT_Reference" is "0:10:10". In addition, the "scale" is "11", and the "UN_leap_control" is "10".

A case is considered where the specific NPT time tot is "0:10:11". In this case, on the basis of the above-described mathematical expression (1), the specific NPT time tut is calculated as "8:59:57". In this case, the time is set as the specific UTC time tut corresponding to the specific NPT time tnt as it is.

Next, a case is considered where the specific NPT time tnt is "0:10:14". In this case, on the basis of the above-described mathematical expression (1), the specific NPT time tut is calculated as "9:00:00". In this case, a time obtained by adding 1 second to the time, that is, "9:00:01" is set as the specific UTC time tut corresponding to the specific NPT time tnt. With the addition adjustment, influence of the leap second deletion is removed.

In addition, in a case where the "UN_leap_control" is "11", the UTC time indicated by the "UTC_Reference" is a time before leap second addition (including the first second of the times overlapping due to leap second addition) and is another time excluding a time before leap second deletion (including the second second of the times overlapping due to the leap second addition). In this case, the calculated specific UTC time is always set as the specific UTC time corresponding to the specific NPT time as it is.

Figure 15:
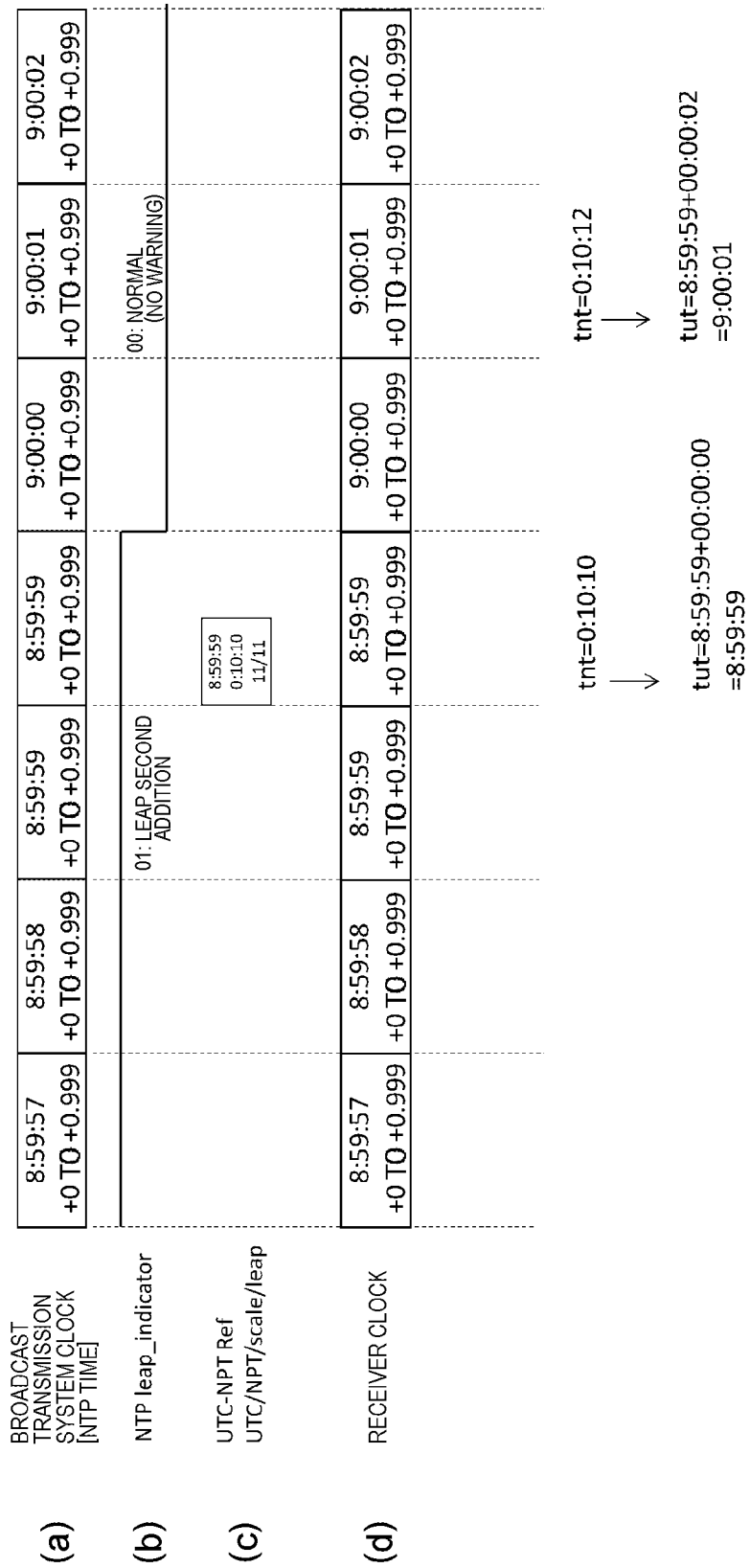
FIG. 15 is a diagram showing example adjustment processing of when the UTC time of the UTC-NPT reference descriptor is the second second of the times overlapping due to leap second addition.

FIG. 15 shows example adjustment processing of when the UTC time of the UTC-NPT reference descriptor is the second second of the times overlapping due to leap second addition. FIG. 15(a) indicates the absolute time information (NTP time) being the clock of the broadcast transmission system 100, and the leap second is added (inserted). FIG. 15(d) indicates the absolute time information (NTP time) being the clock of the receiver 200, and the absolute time information changes similarly to the clock of the broadcast transmission system 100.

FIG. 15(b) shows a value of the leap second indicator (leap_indicator). In this case, the leap second indicator is "01" until "9:00:00" at which insertion of the leap second ends, and is "00" after that. FIG. 15(c) shows the UTC-NPT reference descriptor including the mapping information (tur, tnr). Here, the UTC time tur indicated by the "UTC_Reference" is "8:59:59", and the NPT time tnr indicated by the "NPT_Reference" is "0:10:10". In addition, the "scale" is "11", and the "UN_leap_control" is "11".

A case is considered where the specific NPT time tnt is "0:10:10". In this case, on the basis of the above-described mathematical expression (1), the specific NPT time tut is calculated as "8:59:59". In this case, the time is set as the specific UTC time tut corresponding to the specific NPT time tnt as it is. Next, a case is considered where the specific NPT time tnt is "0:10:12". In this case, on the basis of the above-described mathematical expression (1), the specific NPT time tut is calculated as "9:00:01". Also in this case, the time is set as the specific UTC time tut corresponding to the specific NPT time tnt as it is.

Example Configuration of Broadcast Transmission System

Figure 16:
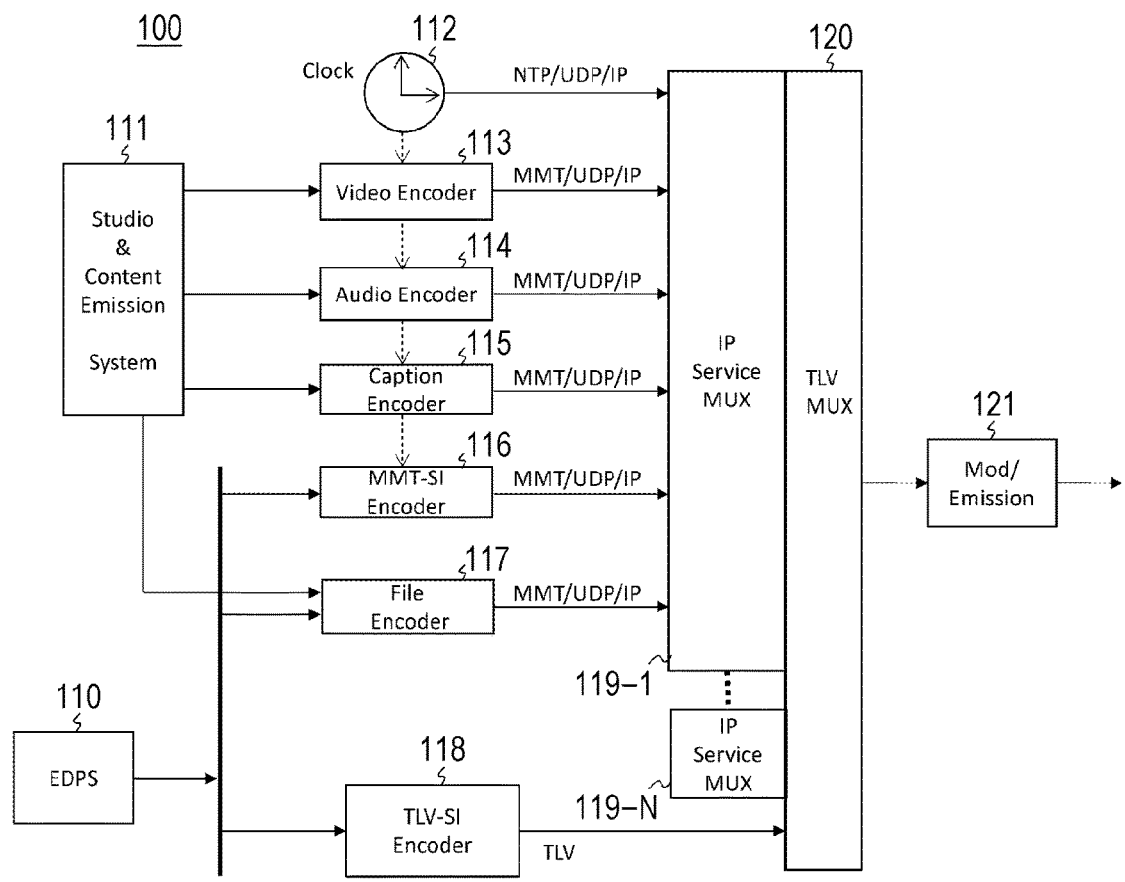
FIG. 16 is a block diagram showing an example configuration of the broadcast transmission system.

FIG. 16 shows an example configuration of the broadcast transmission system 100. The broadcast transmission system 100 includes an Electronic Data Processing System (EDPS) 110, a signal transmission unit 111, an NTP clock generating unit (clock unit) 112, a video encoder 113, an audio encoder 114, a caption encoder 115, and an MMT signaling encoder 116. In addition, the broadcast transmission system 100 includes a file encoder 117, a TLV signaling encoder 118, N IP service multiplexers 119-1 to 119-N, a TLV multiplexer 120, and a modulation/transmission unit 121.

In the NTP clock generating unit (clock unit) 112, NTP data is generated including UTC time information synchronized with NTP time information acquired from the outside (see FIG. 6), and an IP packet including the NTP data is transmitted to the IP service multiplexer 119-1. The signal transmission unit 111 is, for example, a studio of a TV station, or a recording and reproducing machine such as a VTR, and transmits stream data such as video, audio, and subtitles as transmission media, and file data such as HTML document data being non-timed media, to each encoder.

In the video encoder 113, a video signal transmitted from the signal transmission unit 111 is encoded and further packetized, and an IP packet including a video MMTP packet is transmitted to the IP service multiplexer 119-1. In the audio encoder 114, an audio signal transmitted from the signal transmission unit 111 is encoded and further packetized, and an IP packet including an audio MMTP packet is transmitted to the IP service multiplexer 119-1. In the caption encoder 115, a subtitle signal transmitted from the signal transmission unit 111 is encoded and further packetized, and an IP packet including a subtitle MMTP packet is transmitted to the IP service multiplexer 119-1.

In the MMT signaling encoder 116, a signaling message is generated, and an IP packet including an MMTP packet in which the signaling message is arranged in the payload section is transmitted to the IP service multiplexer 119-1. As one of the signaling messages, an M2 section message exists. The M2 section message includes an event message table. The UTC-NPT reference descriptor (see FIG. 9) is stored in the event message table and intermittently transmitted.

Figure 17:
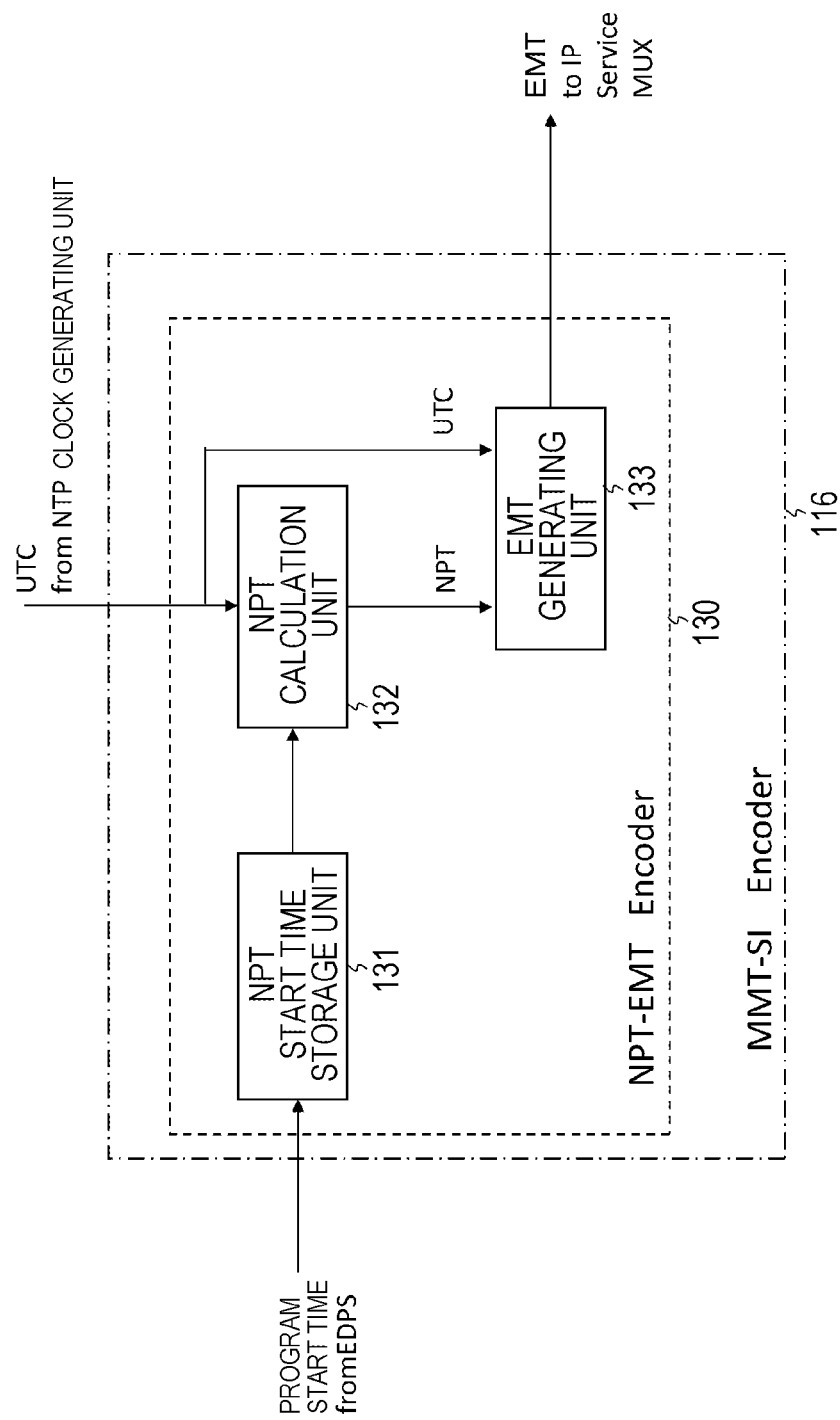
FIG. 17 is a block diagram showing an example configuration of an NPT-EMT encoder in an MMT signaling encoder.

As shown in FIG. 17, an NPT-EMT encoder 130 exists in the MMT signaling encoder 116. The NPT-EMT encoder 130 includes an NPT start time storage unit 131, an NPT calculation unit 132, and an EMT generating unit 133. In the NPT start time storage unit 131, a program start time supplied from the Electronic Data Processing System (EDPS) 110 is stored. In the NPT calculation unit 132, NPT time information is calculated on the basis of the program start time and the UTC time information supplied from the NTP clock generating unit 112.

In the EMT generating unit 133, the UTC time information supplied from the NTP clock generating unit 112 and the NPT time information calculated by the NPT calculation unit 132 are used, and the UTC-NPT reference descriptor (see FIG. 9) is generated in which the mapping information between the UTC time and the NPT time, the leap second adjustment information "UN_leap_control", and the like are described, and further an event message table (EMT) is generated in which the UTC-NPT reference descriptor is stored. In this case, the leap second adjustment information "UN_leap_control" is set to a value according to what time the UTC time is, and the type of adjustment is indicated (see FIG. 10).

Returning to FIG. 16, in the file encoder 117, the file data transmitted from the signal transmission unit 111 are synthesized or divided if necessary, and an MMTP packet including the file data is generated, and an IP packet including the MMTP packet is transmitted to the IP service multiplexer 119-1.

In the IP service multiplexer 119-1, time division multiplexing is performed of IP packets transmitted from the encoders. At this time, in the IP service multiplexer 119-1, an UDP header and a TLV header are added to each IP packet, and a TLV packet is made. In the IP service multiplexer 119-1, one channel part to be inserted in one transponder is configured. In the IP service multiplexers 119-2 to 119-N, other channel parts are configured, each of which has a function similar to the IP service multiplexer 119-1 and is inserted in its one transponder.

In the TLV signaling encoder 118, Signaling information is generated, and a TLV packet is generated in which the Signaling information is arranged in the payload section. In the TLV multiplexer 120, the TLV packets generated in the IP service multiplexers 119-1 to 119-N and the TLV signaling encoder 118 are multiplexed, and an MMT system broadcast stream is generated. In the modulation/transmission unit 121, RF modulation processing is performed to the MMT system broadcast stream generated by the TLV multiplexer 120, and the broadcast stream is transmitted to an RF transmission path.

Example Configuration of Receiver

Figure 18:
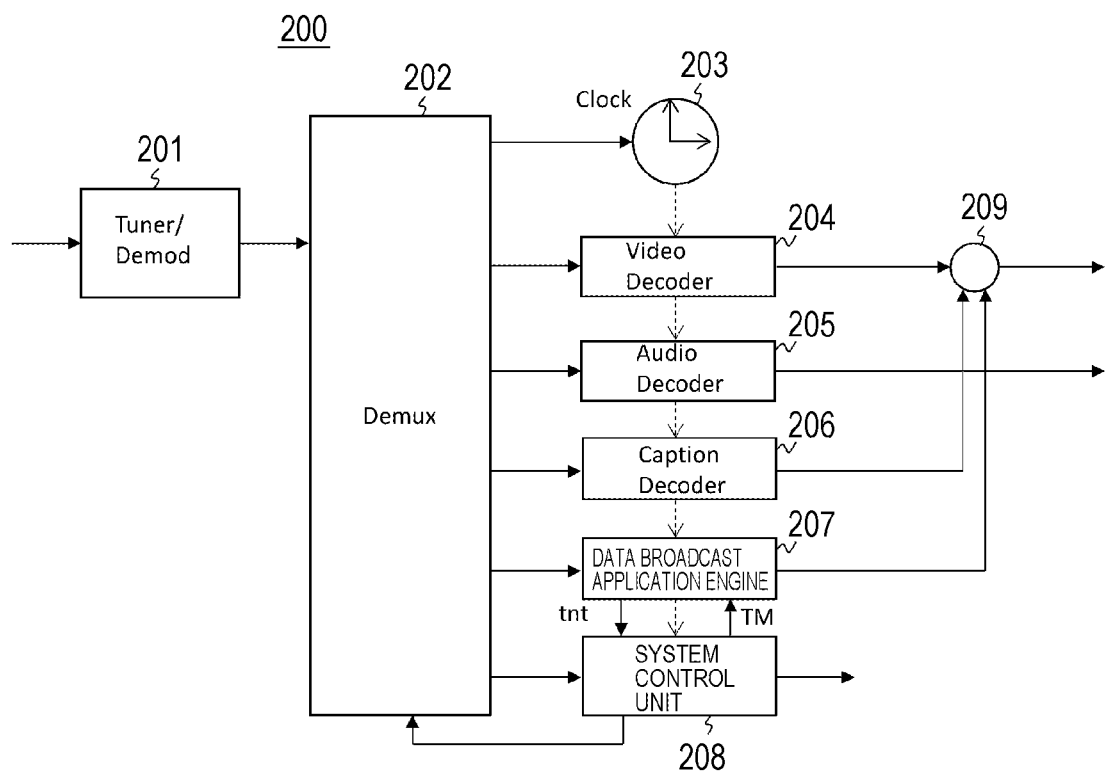
FIG. 18 is a block diagram showing an example configuration of the receiver.

FIG. 18 shows an example configuration of the receiver 200. The receiver 200 includes a tuner/demodulation unit 201, a demultiplexer 202, an NTP clock reproducing unit (clock unit) 203, a video decoder 204, an audio decoder 205, a caption decoder 206, a data broadcast application engine 207, a system control unit 208, and a synthesis unit 209.

In the tuner/demodulation unit 201, RF modulation signal is received, and demodulation processing is performed, and the MMT system broadcast stream is obtained. In the demultiplexer 202, demultiplexing processing and depacketizing processing are performed to the broadcast stream, and the NTP time information, the signaling information, encoded video, audio, subtitle signals, and further the file data are obtained. Incidentally, here, it is assumed that the file data configures data broadcast contents.

In the system control unit 208, each unit of the receiver 200 is controlled on the basis of the signaling information obtained in the demultiplexer 202, operation information from a user operation unit not shown, and the like. In the NTP clock reproducing unit (clock unit) 203, the UTC time information synchronized with the time information is generated on the basis of the NTP time information obtained in the demultiplexer 202.

In the video decoder 204, decoding of the encoded video signal obtained in the demultiplexer 202 is performed, and a baseband video signal is obtained. In the audio decoder 205, decoding of the encoded audio signal obtained in the demultiplexer 202 is performed, and a baseband audio signal for audio output is obtained.

In the caption decoder 206, decoding of the encoded subtitle signal obtained in the demultiplexer 202 is performed, and a subtitle display signal is obtained. In the data broadcast application engine 207, the file data obtained in the demultiplexer 202 is processed, and a data broadcast display signal is obtained. Here, in a case where the file data is the application linked with the program, in the data broadcast application engine 207, by the Application Programming Interface (API) of "setAlarmByUTCNPT", the application is registered as an application to be executed at the timing of the specific NPT time.

In the data broadcast application engine 207, execution of the registered application is started at the timing of the specific UTC time, and a predetermined data broadcast display signal is generated. In this case, the specific NPT time tnt is supplied as a target NPT from the data broadcast application engine 207 to the system control unit 208. In the system control unit 208, the specific UTC time tut corresponding to the specific NPT time is calculated as the target UTC.

Then, in the system control unit 208, a timing signal TM is generated at timing at which the UTC time indicated by the UTC time information generated in the NTP clock reproducing unit 203 coincides with the target UTC, and the timing signal is transmitted to the data broadcast application engine 207. In the data broadcast application engine 207, on the basis of the timing signal TM, execution of the application is started, and the predetermined data broadcast display signal is generated.

FIG. 19 shows an example configuration of an NPT processing unit 220 in the system control unit 208. The NPT processing unit 220 includes a target NPT (tnt) storage unit 221, an EMT analysis unit 222, a storage unit 223 storing the mapping information between the UTC time and the NPT time, a target UTC (tut) calculation unit 224, and a target UTC detection unit 225.

In the target NPT (tnt) storage unit 221, the specific NPT time tnt supplied from the data broadcast application engine 207 is stored as a target NPT. In the EMT analysis unit 222, the event message table (EMT) extracted in the demultiplexer 202 is analyzed, and information such as the mapping information between the UTC time and the NPT time, or the leap second adjustment information "UN_leap_control" is extracted from the UTC-NPT reference descriptor stored in the table. Then, the extracted information is stored in the storage unit 223.

In the target UTC calculation unit 224, the specific UTC time tut corresponding to the specific NPT time tnt is calculated as a target UTC, by the above-described mathematical expression (1), on the basis of the mapping information stored in the storage unit 223, and further, the calculated target UTC is adjusted on the basis of the leap second adjustment information stored in the storage unit 223.

In the target UTC detection unit 225, the UTC time indicated by the UTC time information generated in the NTP clock reproducing unit 203 is monitored, and the timing signal TM is generated at the timing at which the UTC time coincides with the target UTC calculated in the target UTC calculation unit 224, and supplied from the data broadcast application engine 207.

Returning to FIG. 18, the baseband video signal obtained in the video decoder 204 is supplied to the synthesis unit 209. In addition, the subtitle display signal obtained in the caption decoder 206 is supplied to the synthesis unit 209. Further, the predetermined data broadcast display signal obtained in the data broadcast application engine 207 is supplied to the synthesis unit 209. In the synthesis unit 209, these video signal and display signals are synthesized, and a video signal for video display is obtained.

As described above, in the transmission/reception system 10 shown in FIG. 1, the leap second adjustment information is included in the mapping information between the NPT time and the UTC time intermittently transmitted from the broadcast transmission system 100 to the receiver 200. For that reason, in the receiver 200, the specific UTC time corresponding to the specific NPT time obtained on the basis of the mapping information can be adjusted on the basis of the leap second adjustment information, and it is possible to appropriately obtain the specific UTC time corresponding to the specific NPT time without being influenced by occurrence of the leap second. With this configuration, in the data broadcast application engine 207 of the receiver 200, it is possible to execute the application linked with the program at correct timing without being influenced by occurrence of the leap second.

2. Modification

Incidentally, in the above-described embodiment, an example has been shown in which the MMT system broadcast stream is treated. Although detailed description is omitted, it is obvious that the present technology can be similarly applied to a case where a similar broadcast stream is treated.

In addition, the present technology may also be embodied in the configurations described below.

(1) A transmission device including
a transmission unit that transmits transmission media of a program, and intermittently transmits mapping information between an NPT time represented by a relative time from a beginning of the program and a UTC time represented by an absolute time with leap second adjustment information included.

(2) The transmission device according to the (1), in which
the transmission unit
includes the transmission media in a first packet to transmit the transmission media, and includes the mapping information and the leap second adjustment information in a second packet to transmit the mapping information and the leap second adjustment information.

(3) The transmission device according to the (2), in which
the first packet and the second packet are MMTP packets.

(4) The transmission device according to any of the (1) to (3), in which
the transmission unit intermittently transmits a UTC-NPT reference descriptor in which the mapping information and the leap second adjustment information are described.

(5) A transmission method including
a transmission step of transmitting transmission media of a program, and intermittently transmitting mapping information between an NPT time represented by a relative time from a beginning of the program and a UTC time represented by an absolute time with leap second adjustment information included.

(6) A reception device including:
a reception unit that receives transmission media of a program, and intermittently receives mapping information between an NPT time represented by a relative time from a beginning of the program and a UTC time represented by an absolute time, the mapping information including leap second adjustment information; and
a time calculation adjustment unit that obtains a specific UTC time corresponding to a specific NPT time on the basis of the mapping information intermittently received, and adjusts the specific UTC time obtained, on the basis of the leap second adjustment information.

(7) The reception device according to the (6), further including
an application processing unit that executes an application linked with the program, in which
the application processing unit
transmits the specific NPT time to the time calculation adjustment unit, and receives the specific UTC time from the time calculation adjustment unit, and starts execution of the application at timing of the specific UTC time.

(8) A reception method including:
a reception step of receiving transmission media of a program, and intermittently receiving mapping information between an NPT time represented by a relative time from a beginning of the program and a UTC time represented by an absolute time, the mapping information including leap second adjustment information, by a reception unit; and
a time calculation adjustment step of obtaining a specific UTC time corresponding to a specific NPT time on the basis of the mapping information intermittently received, and adjusting the specific UTC time obtained, on the basis of the leap second adjustment information.

A main feature of the present technology is that, by including the leap second adjustment information in the mapping information between the NPT time and the UTC time intermittently transmitted from the broadcast transmission system 100 to the receiver 200, in the reception side, it is possible to appropriately obtain the specific UTC time corresponding to the specific NPT time without being influenced by occurrence of the leap second (see FIGS. 9 and 10).

REFERENCE SIGNS LIST

10 Transmission/reception system
100 Broadcast transmission system
110 Electronic data processing system (EDPD)
111 Signal transmission unit
112 NTP clock generating unit (clock unit)
113 Video encoder
114 Audio encoder
115 Caption encoder
116 MMT signaling encoder
117 File encoder
118 TLV signaling encoder 119-1 to 119-N IP service multiplexer
120 TLV multiplexer
121 Modulation/transmission unit
130 NPT-EMT encoder
131 NPT start time storage unit
132 NPT calculation unit
133 EMT generating unit
200 Receiver
201 Tuner/demodulation unit
202 Demultiplexer
203 NTP clock reproducing unit (clock unit)
204 Video decoder
205 Audio decoder
206 Caption decoder
207 Data broadcast application engine
208 System control unit
209 Synthesis unit
220 NPT processing unit
221 Target NPT (tnt) storage unit
222 EMT analysis unit
223 Storage unit
224 Target UTC (tut) calculation unit
225 Target UTC detection unit

The invention claimed is:

1. A transmission device comprising
a transmitter configured to
transmit transmission media of a program, and
intermittently transmit mapping information between a Normal Play Time (NPT) time represented by a relative time from a beginning of the program and a Coordinated Universal Time (UTC) time represented by an absolute time including leap second adjustment information indicating a type of adjustment for UTC time obtained based on the mapping information.

2. The transmission device according to claim 1, wherein the transmitter is further configured to include the transmission media in a first packet, and include the mapping information and the leap second adjustment information in a second packet to.

3. The transmission device according to claim 2, wherein the first packet and the second packet are MPEG Media Transport Protocol (MMTP) packets.

4. The transmission device according to claim 1, wherein the transmitter is further configured to intermittently transmit a UTC-NPT reference descriptor in which the mapping information and the leap second adjustment information are described.

5. A transmission method comprising:
transmitting transmission media of a program, and
intermittently transmitting mapping information between a Normal Play Time (NPT) time represented by a relative time from a beginning of the program and a Coordinated Universal Time (UTC) time represented by an absolute time including leap second adjustment information indicating a type of adjustment for UTC time obtained based on the mapping information.

6. A reception device comprising:
circuitry configured to
receive transmission media of a program, and
intermittently receive mapping information between a Normal Play time (NPT) time represented by a relative time from a beginning of the program and a Coordinated Universal Time (UTC) time represented by an absolute time, the mapping information including leap second adjustment information indicating a type of adjustment for UTC time obtained based on the mapping information; and
obtain a specific UTC time corresponding to a specific NPT time based on the mapping information intermittently received, and adjust the obtained specific UTC time based on the type of adjustment indicated in the leap second adjustment information.

7. The reception device according to claim 6, wherein the circuitry is further configured to
execute an application linked with the program,
obtain the specific UTC time, and
start execution of the application at timing of the specific UTC time.

8. A reception method comprising:
receiving, by circuitry, transmission media of a program, and intermittently receiving napping information between a Normal Play time (NPT) time represented by a relative time from a beginning of the program and a Coordinated Universal Time (UTC) time represented by an absolute time, the mapping information including leap second adjustment information indicating a type of adjustment for UTC time obtained based on the mapping information; and
obtaining a specific UTC time corresponding to a specific NPT time based on the mapping information intermittently received, and adjusting the obtained specific UTC time based on the type of adjustment indicated in the leap second adjustment information.

9. The transmission device according to claim 1, wherein the leap second adjustment information indicates whether the UTC time is a time before leap second addition, a time before leap second deletion, or is a time other than the time before the leap second addition or the time before the leap second deletion.

10. The transmission device according to claim 9, wherein no adjustment is performed when the leap second adjustment information indicates that the UTC time is a time other than the time before the leap second addition or the time before leap second deletion.

* * * * *